United States Patent [19]
Horiuchi

[11] Patent Number: 4,998,804
[45] Date of Patent: Mar. 12, 1991

[54] TRANSMISSIVE LIQUID CRYSTAL DISPLAY DEVICE

[75] Inventor: Kenji Horiuchi, Osaka, Japan

[73] Assignee: Sharp Kabushiki Kaisha, Osaka, Japan

[21] Appl. No.: 361,402

[22] Filed: Jun. 5, 1989

[30] Foreign Application Priority Data

Aug. 29, 1988 [JP] Japan ................. 63-214674

[51] Int. Cl.$^5$ ............................................. G02F 1/13
[52] U.S. Cl. ................................. 350/334; 350/338; 350/339 D; 350/345; 362/26
[58] Field of Search ............ 350/339 D, 338, 345, 350/334; 362/26, 31, 223

[56] References Cited

U.S. PATENT DOCUMENTS

| 4,042,294 | 8/1977 | Billings, Jr. et al. | 350/339 D |
| 4,422,732 | 12/1983 | Ditzik | 350/356 |
| 4,714,983 | 12/1987 | Lang | 350/345 X |
| 4,748,546 | 5/1988 | Ukrainsky | 350/345 X |
| 4,826,294 | 5/1989 | Imoto | 350/345 |

OTHER PUBLICATIONS

"Fluorescent Plastic Light Source Brightens LCD" Electronic International, vol. 50, No. 12, Jun. 9, 1977.

Primary Examiner—Stanley D. Miller
Assistant Examiner—Huy K. Mai
Attorney, Agent, or Firm—Flehr, Hohbach, Test, Albritton & Herbert

[57] ABSTRACT

A transmissive liquid crystal display device is comprised not only of a light scattering plate disposed behind a liquid crystal display cell, a light diffusing film disposed behind this light scattering plate and a light source lamp and a reflective plate disposed behind this light diffusing film but also of a transparent plate disposed between the light diffusing film and the light source lamp. The reflective plate serves to direct backward propagating light from the source lamp towards the liquid crystal display cell, and the transparent plate has an indentation formed on its back surface. This indentation is shaped correspondingly to the shape of the light source lamp and contains the light source lamp inside.

7 Claims, 4 Drawing Sheets

TRANSMISSIVE LIQUID CRYSTAL DISPLAY DEVICE

BACKGROUND OF THE INVENTION

This invention relates to a transmissive liquid display device having a liquid crystal cell illuminated from behind by a light source.

As disclosed, for example, in Japanese Utility Model Publications Jikkai No. 56-145078, Japanese Patent Publication Tokkai No. 59-94738 and Japanese Utility Model Publication Jikkai 60-120484, most conventional transmissive liquid crystal display devices of this type have a light scattering plate or a filter between a liquid crystal display cell and a source lamp such that the liquid crystal display cell can be illuminated uniformly. With such a light scattering plate, however, it is difficult to accurately match the intensity characteristics of a source lamp and there frequently arises a problem of unevenness in the intensity of the liquid crystal display cell.

SUMMARY OF THE INVENTION

It is therefore an object of the present invention to provide a transmissive liquid crystal display device capable of uniformly illuminating its liquid crystal display cell with improved efficiency.

A transmissive liquid crystal display device according to the present invention, with which the above and other objects can be achieved, is characterized as having not only a light scattering plate disposed behind a liquid crystal display cell, a light diffusing film disposed behind this light scattering plate and a light source lamp and a reflective plate disposed behind this light diffusing film but also a transparent plate disposed between the light diffusing film and the light source lamp. The reflective plate serves to direct backward propagating light from the source lamp towards the liquid crystal display cell, and the transparent plate has an indentation formed on its back surface. This indentation is shaped correspondingly to the shape of the light source lamp and contains the light source lamp inside.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1:
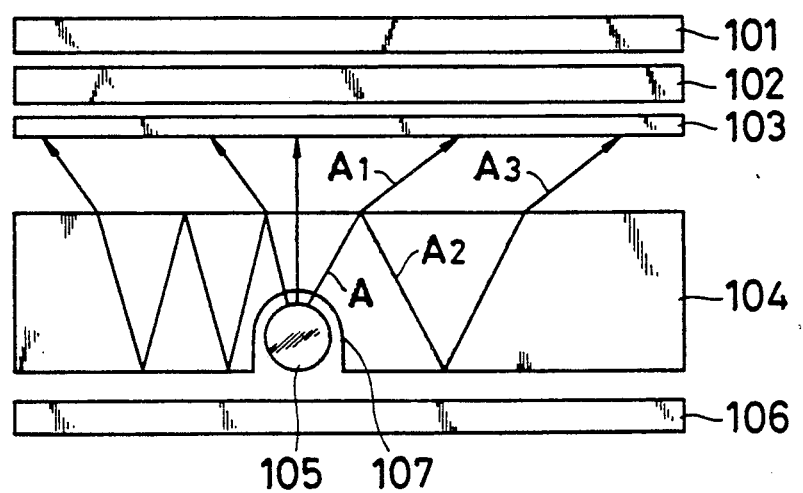
FIG. 1 is a drawing for explaining the principles of the present invention.

In FIG. 1, numeral 101 indicates a liquid crystal display cell, numeral 102 indicates a light scattering plate, numeral 103 indicates a light diffusing film disposed behind the light scattering plate 102, numeral 104 indicates a transparent plate disposed between the light diffusing film 103 and a lamp 105 serving as a light source, numeral 106 indicates a reflective plate for reflecting backward propagating light into the direction of the liquid crystal display cell 101 and numeral 107 indicates an indentation formed in the shape of the source lamp 105 on the back surface of the transparent plate 104. The source lamp 105 is contained in this indentation 107.

The light scattering plate 102 is provided such that incoming light made incident thereon from one side thereof is scattered out from the other surface thereof. For this purpose, use may principally be made of a transparent plate with many protrusions and indentations formed on one surface thereof or a milky white translucent plate made of a transparent resin material mixed with a filler comprised of aluminum or glass powder. The light diffusing film 103, on the other hand, is for the purpose of locally varying the transmissivity of light uniformly made incident on one surface thereof. It may be formed, for example, by uniformly depositing aluminum on a film either by vapor deposition or sputtering and thereafter partially removing the aluminum by an etching process. The transparent plate 104 may be of an acryl or polycarbonate resin material or of quartz glass. The lamp 105 may be either cylindrical (serving as a line source) or spherical (serving as a point source). If the light source 105 is a cylindrical lamp such as a cold cathode lamp, it is preferable that the indentation 107 be a groove with a U-shaped cross-section correspondingly to the shape of the lamp. If the light source is spherical such as an incandescent lamp, it is preferable that the indentation 107 be a circular hole with a hemispherically shaped bottom surface.

As shown in FIG. 1, light A emitted from the source lamp 105 is separated, after it enters the transparent plate 104, into a transmitted part $A_1$ and an internally reflected part $A_2$. The transmitted part $A_1$ is dispersingly propagated in a direction according to the index of refraction of the transparent plate 104 while the reflected part $A_2$ is reflected again internally at the other surface of the transparent plate 104 and is directed towards the light diffusing film 103 as indicated by $A_3$. In summary, the transparent plate 104 with the indentation 107 formed therein serves not only as a diverging lens to disperse the transmitted light but also as a light conductive medium for first enclosing the large amount of light emitted from the source lamp and then guiding it to distant positions separated therefrom. In other words, the emitted light from the source lamp 105 is diffusingly spread by the transparent plate 104 such that its brightness distribution is flattened even before it reaches the light diffusing film 103 and this has the favorable effect of raising the minimum brightness in the distribution. The brightness distribution is further flattened as the light is thereafter passed through the light diffusing film 103 and the light scattering plate 102 such that the illuminating light of the liquid crystal display cell 101 is uniformized at high brightness and an improved illumination efficiency can be attained.

Figure 2:
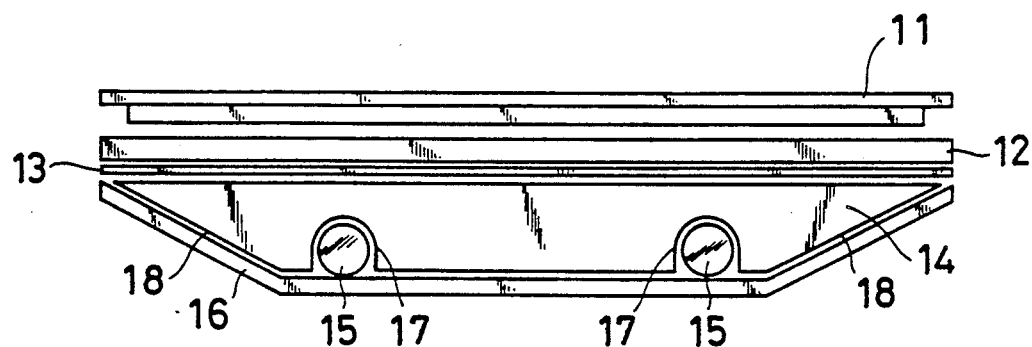
FIG. 2 is a drawing of a transmissive liquid crystal display device embodying the present invention.
Figure 3:
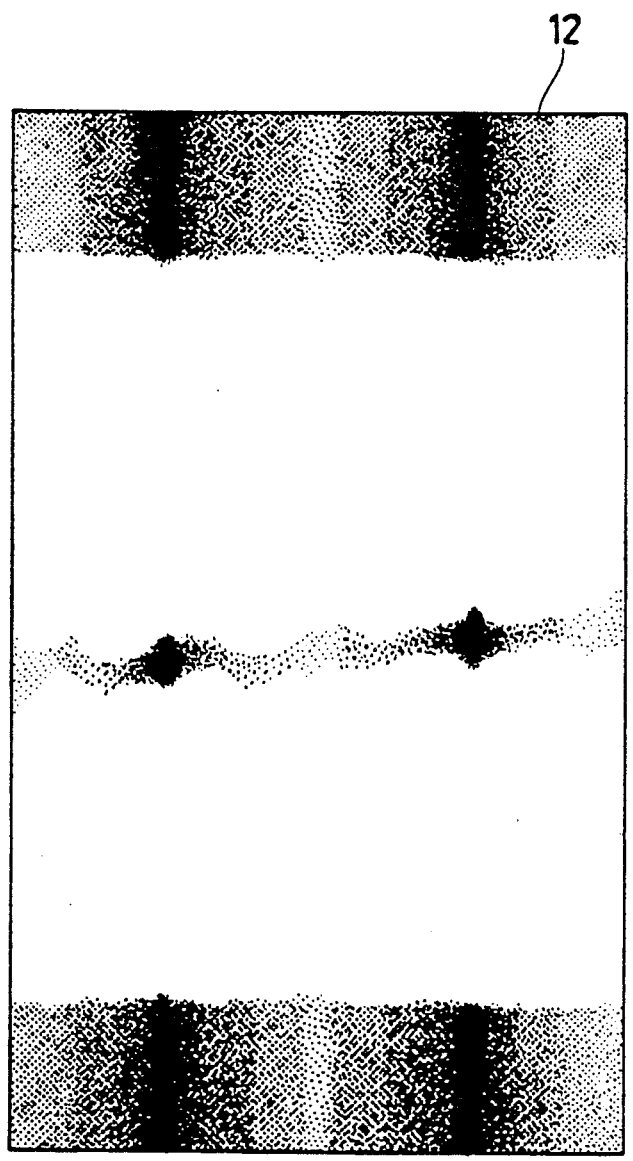
FIG. 3 is a drawing which shows the aluminum deposition on the light diffusing film of FIG. 2.

A transmissive liquid crystal display device embodying the present invention is illustrated in FIG. 2 wherein numeral 11 indicates a matrix liquid crystal display cell with a rectangular display area of size A4 (210 mm × 297 mm) having 640 × 480 dots, numeral 12 indicates a milky white translucent acryl plate of thickness 2 mm, numeral 13 indicates a transparent film having a light diffusing membrane, numeral 14 indicates a transparent plate, numerals 15 each indicate a lamp serving as a light source, numeral 16 indicates a reflective plate, numerals 17 each indicate an indentation formed on the back surface of the transparent plate 14 according to the shape of the source lamps 15 and numerals 18 indicate tapered parts of the transparent plate 14 formed correspondingly to the shape of the reflective plate 16. The source lamps 15 are disposed inside the indentations 17. As the transparent film 13, use is made of a polyethylene terephthalate (PET) film of thickness 2 mm. After aluminum is vapor deposited or sputtered onto the back surface of this film 13, the aluminum is partially removed by an etching process such that its density of deposition becomes as shown in FIG. 3, corresponding to the positions of the source lamps 15. As the transparent plate 14, use is made of an acryl resin plate of thickness 11 mm, light transmissivity 93% and index of refraction 1.49. The source lamps 15 are cold cathode lamps of power 6 W, external diameter 8 mm and length 270 mm. The indentations 17 are grooves of a U-shaped cross-section with width 9 mm.

Figure 4:
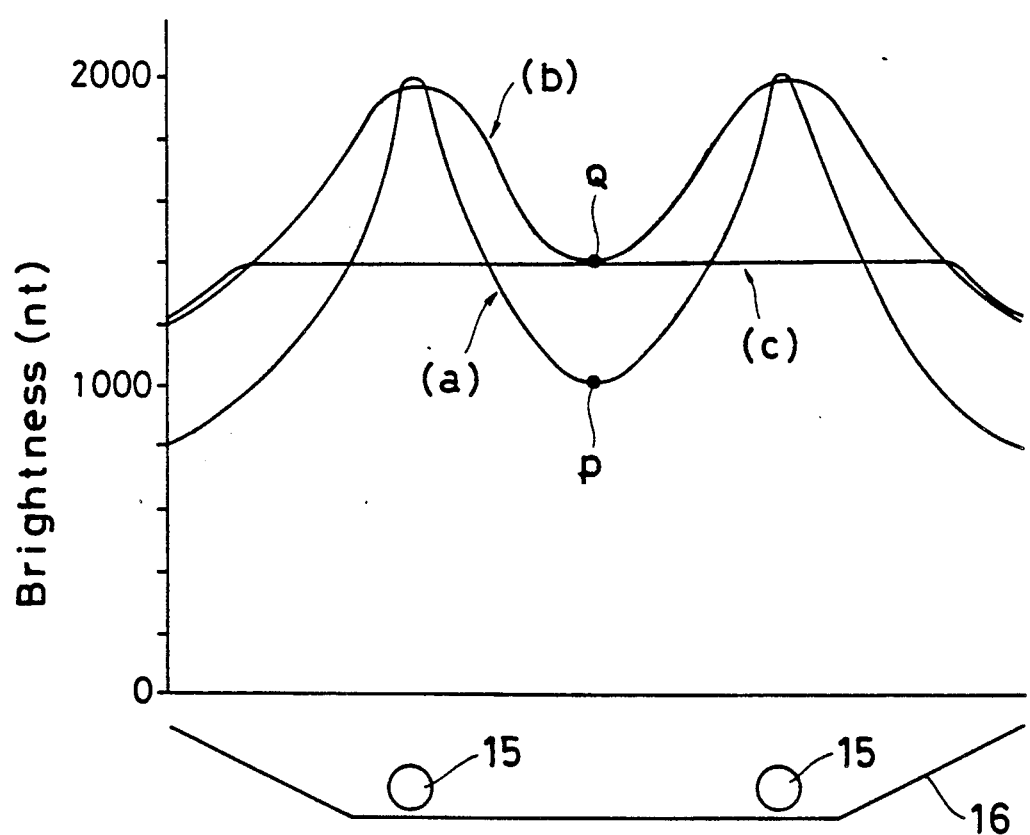
FIG. 4 is a graph showing brightness distribution curves related to the device of FIG. 2.

If the transparent film 12 with a light diffusing membrane and the transparent plate 14 are removed from the device shown in FIG. 2, the brightness distribution of incident light entering the liquid crystal display cell 11 is shown in FIG. 4 by Curve (a) corresponding to the positions of the source lamps 15 and the reflective plate 16, the minimum brightness being indicated by P. If the transparent plate 14 is set as shown in FIG. 2, it functions like a diverging lens because of the indentations 17 formed therein, not only diffusing transmitted light from the lamps 15 towards the liquid crystal display cell 11 but also serving as a light conducting plate to direct the light in diffusing directions. As a result, the brightness distribution of the light illuminating the liquid crystal display cell 11 becomes as flat as shown in FIG. 4 by Curve (b) already before it is made incident onto the light diffusing membrane of the transparent film 12. It is to be noted that the minimum brightness on Curve (b) indicated by Q is significantly higher than P.

Figure 5:
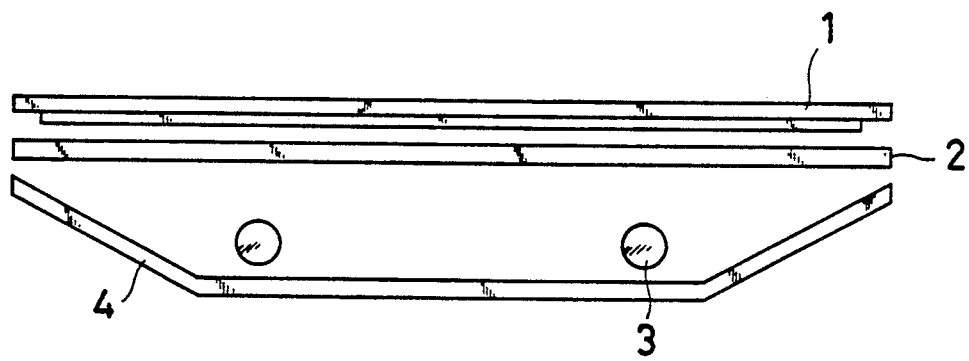
FIG. 5 is a drawing of another transmissive liquid crystal display device which is to be compared with the device shown in FIG. 2.
Figure 6:
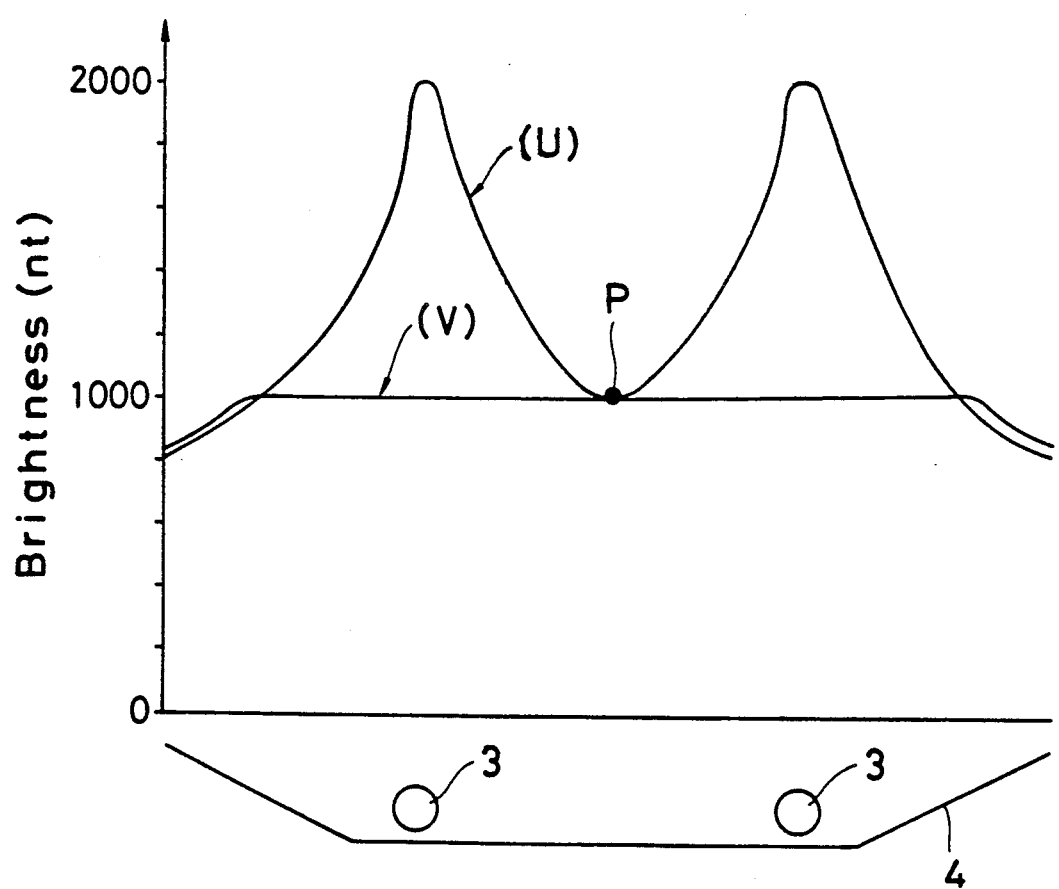
FIG. 6 is a graph showing brightness distribution curves related to the device of FIG. 5.

FIG. 5 shows another transmissive liquid crystal display device produced for the purpose of ascertaining advantageous effects of the present invention. In this device, a light scattering plate 2 is disposed behind a liquid crystal display cell 1, a light diffusing film is formed directly on the back surface of this light scattering plate 2 and the liquid crystal display cell 1 is illuminated by source lamps 3 and a reflective plate 4. FIG. 6 shows the brightness distribution of the device of FIG. 5 with reference to the positions of the source lamps 3 and the reflective plate 4, Curve (U) corresponding to the situation where the light diffusing film is absent and Curve (V) corresponding to the situation where the light diffusing film is present. One clearly sees in FIG. 6 that the widely varying brightness distribution according to the positions of the source lamps 3, as shown by Curve (U), becomes uniform by means of the light diffusing film as shown by Curve (V).

If the brightness distribution is flattened by means only of a light diffusing film as shown by Curves (U) and (V), however, the uniform brightness with the light diffusing film present is at the level of the minimum brightness of Curve (U) indicated by P. Since this minimum brightness P is low, this means that the uniformized brightness with the help of the light diffusing film is also low.

With a device according to the present invention, as explained above with reference to FIG. 2, the brightness distribution is uniformized by the light diffusing film as shown by Curve (c) according to the minimum brightness level Q of Curve (b) which is significantly higher than the level P as explained above. In short, the uniformized brightness level can be raised according to the present invention and the light from the source can illuminate the liquid crystal display cell 11 with improved efficiency.

Figure 7:
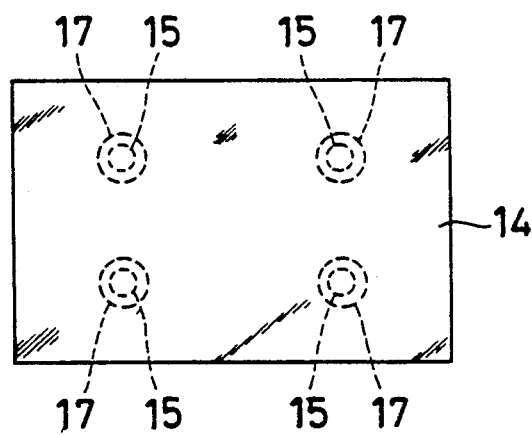
FIG. 7 is a plan view of the transparent plate in still another transmissive liquid crystal display device embodying the present invention.

FIG. 7 shows a portion of still another transmissive liquid crystal display device embodying the present invention. Its side view is the same as shown in FIG. 2 but it is characterized as having point light sources such as incandescent lamps 15 disposed in indentations 17 which are round holes with hemispherical bottom surfaces formed on the back surface of the transparent plate 14. In this example, too, the light scattering membrane may be formed by vapor deposition or sputtering of aluminum with its density determined according to the positions of the individual source lamps 15, and the minimum brightness of the brightness distribution curve is raised by the presence of the transparent plate 14 such that the liquid crystal display cell can be illuminated uniformly and at improved brightness.

The foregoing description of preferred embodiments of the invention has been presented for purposes of illustration and description. It is not intended to be exhaustive or to limit the invention to the precise form disclosed, and many modifications and variations are possible in light of the above teaching. For example, although the light diffusing membrane of FIG. 2 was described as being formed by vapor deposition or sputtering of aluminum on the transparent film 13, this is not intended to limit the scope of the invention. A light diffusing membrane may equally well be formed by direct vapor deposition or sputtering of aluminum on the back surface of the light scattering plate 12. Any such modifications and variations that may be apparent to a person skilled in the art are intended to be included within the scope of this invention. For the measurement of brightness (in units of nt = candela/m$^2$) for FIGS. 4 and 6, use was made of Model BM-5 produced by Tokyo Kogaku Kikai Kabushiki Kaisha (TOPCON).

What is claimed is:

1. A transmissive liquid crystal display device comprising
   a liquid crystal display cell,
   a light scattering plate disposed behind said display cell,
   a light diffusing film disposed behind said light scattering plate,
   a light source lamp and a reflective plate disposed behind said light diffusing film, said reflective plate serving to direct backward propagating light from said source lamp towards said liquid crystal display cell, and
   a transparent plate disposed between said light diffusing film and said light source lamp, said transparent plate having at least one indentation each shaped correspondingly to the shape of said light source lamp, said light source lamp being contained inside said indentation, wherein emitted light from said source lamp reaches said light diffusing film both by directly passing through said transparent plate and by undergoing internal reflections inside said transparent plate.

2. The device of claim 1 wherein said light diffusing film is an aluminum film.

3. The device of claim 1 wherein said light scattering plate comprises a translucent plate made of an acryl resin material.

4. The device of claim 1 wherein said transparent plate is made of acryl or polycarbonate resin.

5. The device of claim 1 wherein said transparent plate is made of quartz glass.

6. The device of claim 1 wherein said light source lamp is cylindrical and each of said indentation is a groove with a U-shaped cross-section.

7. The device of claim 1 wherein said light source lamp is spherical and each of said indentation is a circular hole with a hemispherically formed bottom surface.

* * * * *